No. 872,031.
PATENTED NOV. 26, 1907.
W. O. THOMAS & H. G. MOORE.
AUTOMOBILE BODY.
APPLICATION FILED AUG. 29, 1906.
3 SHEETS—SHEET 1.
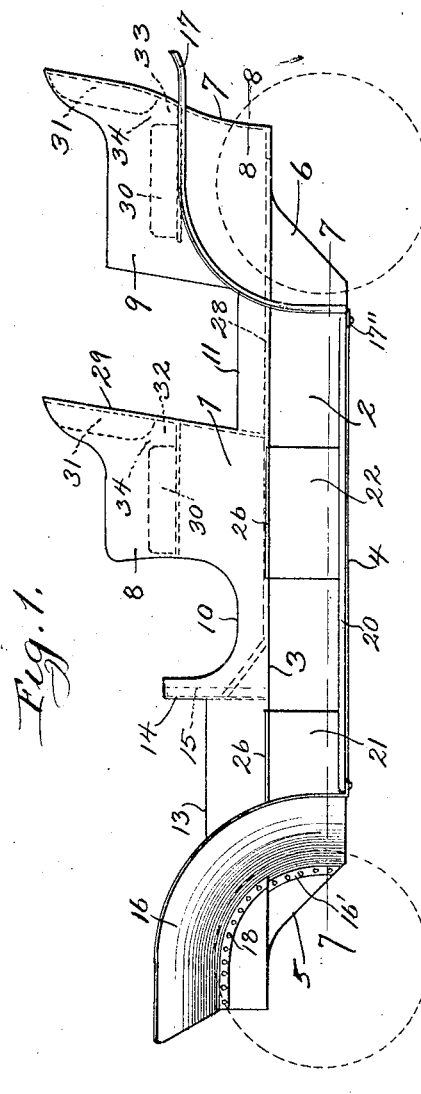
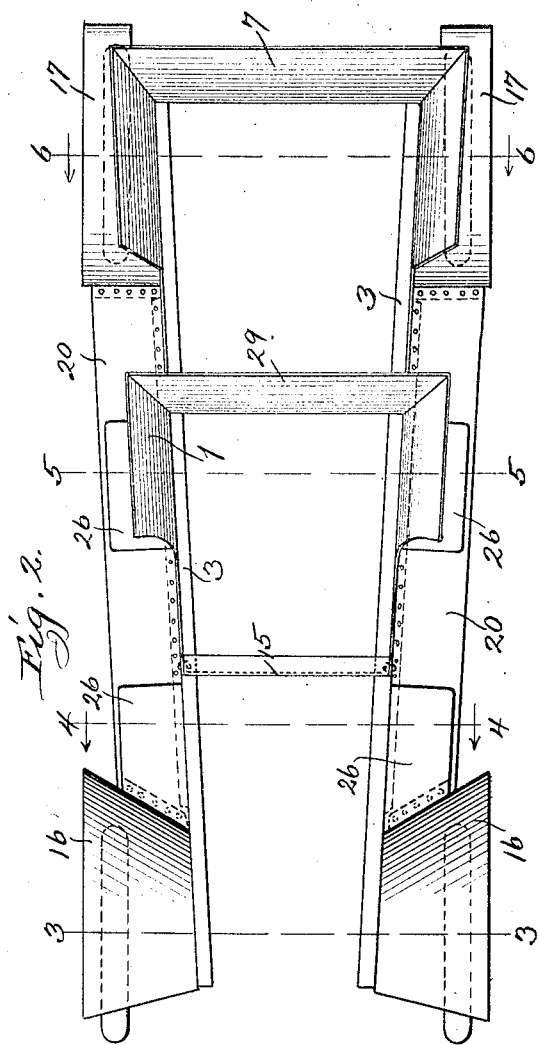

No. 872,031. PATENTED NOV. 26, 1907.
W. O. THOMAS & H. G. MOORE.
AUTOMOBILE BODY.
APPLICATION FILED AUG. 29, 1906.
3 SHEETS—SHEET 2.
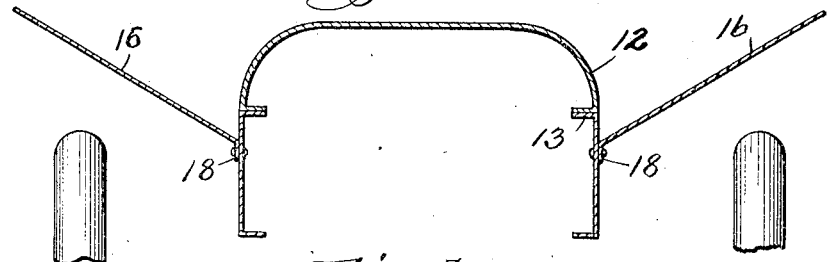
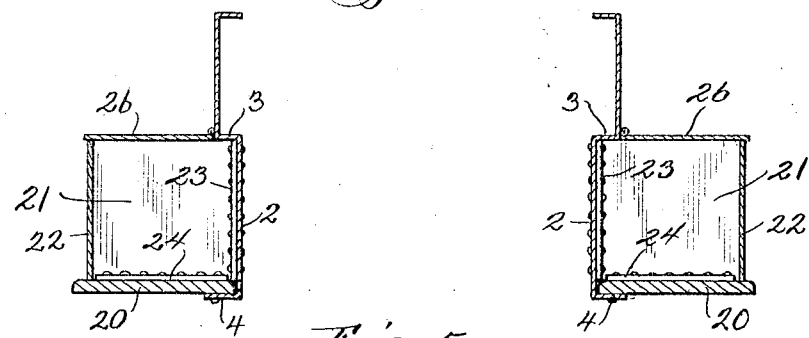
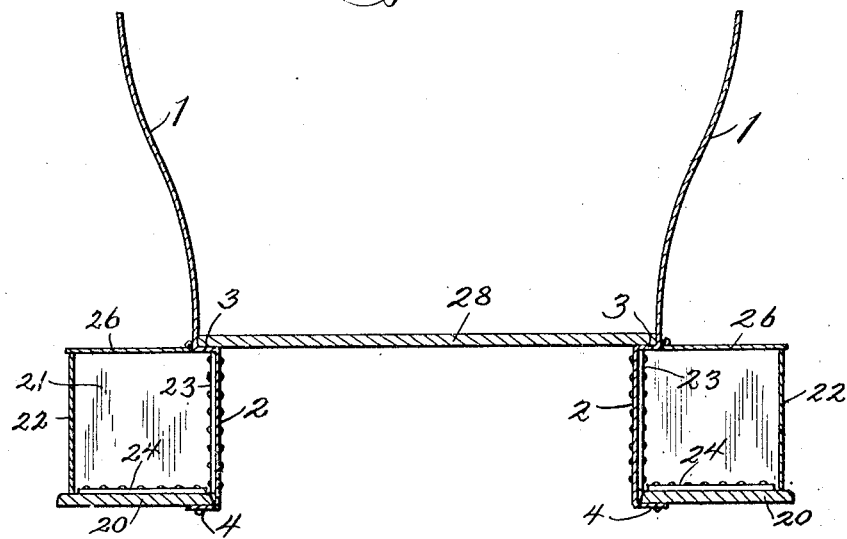
Witnesses:
R. J. Jacker
Emilie Close
Inventors:
Willie O. Thomas,
Harry G. Moore,
By Albert W. Graves,
Atty.

No. 872,031. PATENTED NOV. 26, 1907.
W. O. THOMAS & H. G. MOORE.
AUTOMOBILE BODY.
APPLICATION FILED AUG. 29, 1906.
3 SHEETS—SHEET 3.
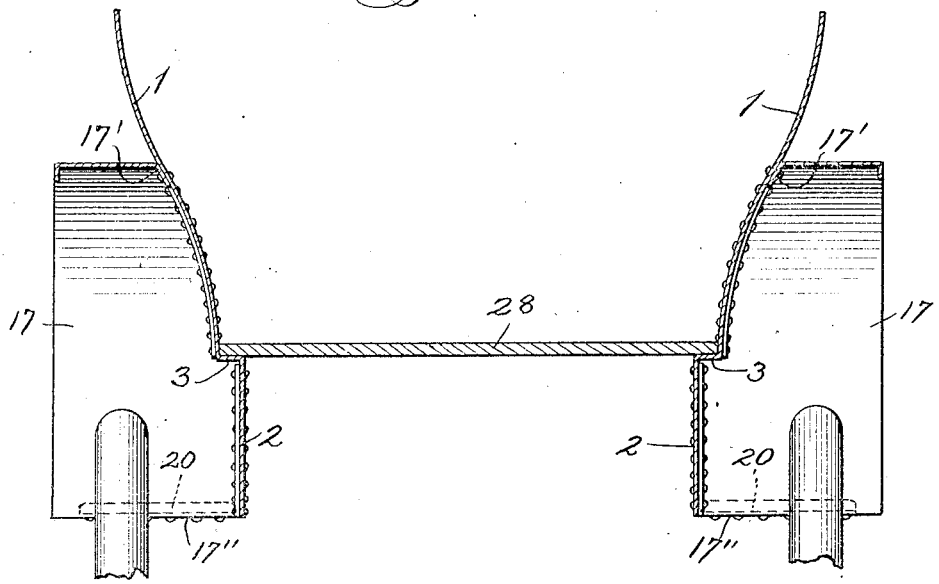
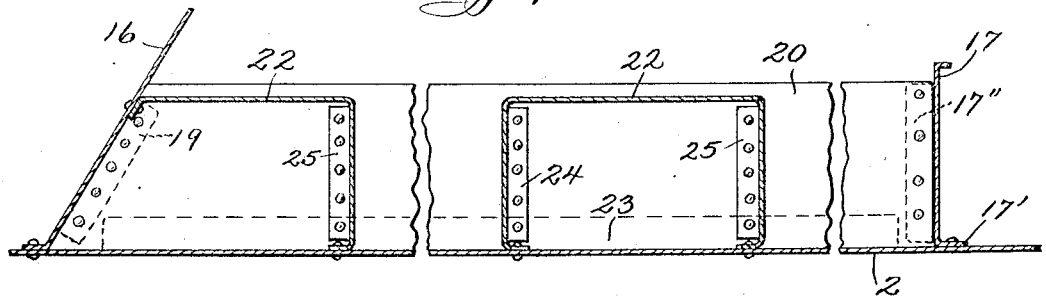
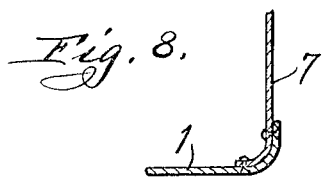
Witnesses
K. J. Jaeker
Emilie Rose
Inventors:
Willie O. Thomas,
Harry G. Moore,
By Albert N. Graves,
Atty.

UNITED STATES PATENT OFFICE.

WILLIE O. THOMAS, OF RIVERSIDE, AND HARRY G. MOORE, OF CHICAGO, ILLINOIS.

AUTOMOBILE-BODY.

No. 872,031.        Specification of Letters Patent.        Patented Nov. 26, 1907.

Application filed August 29, 1906. Serial No. 332,412.

*To all whom it may concern:*

Be it known that we, WILLIE O. THOMAS and HARRY G. MOORE, a subject of Great Britain and citizen of the United States, respectively, residing at Riverside and Chicago, respectively, in the county of Cook and State of Illinois, have invented certain new and useful Improvements in Automobile-Bodies, of which the following is a specification.

This invention relates to improvements in automobile bodies, and refers more specifically to a construction in which the under frame and sides and ends are made integral with each other.

Among the salient objects of the invention are, to provide a construction in which the usual chassis or under-frame is dispensed with and the side and end walls continued downwardly to form parts corresponding to and performing the functions of such underframe members; to provide in such a body a construction in which sundry applied parts, as for example the wheel guards and tool and battery boxes, are so mounted as to add their strength and stiffness to the strength and stiffness of the side walls of the body, rendering the structure as a whole sufficiently rigid and strong to enable the usual underframe members to be dispensed with; to provide a construction in which the side bodies are in themselves so formed as to afford a maximum strength and rigidity against vertical or breaking-down stresses; to provide a construction in which the necessity of brackets, hangers and other accessories for supporting the several parts, is dispensed with; to minimize the cost of construction; to provide a construction which conforms in general to the accepted or conventional form of automobile bodies now in use; to provide improvements in certain details of construction whereby the parts are united and made to mutually contribute to the strength of each other; and, in general, to provide a simple and improved body of the character referred to, which is at once light, strong and durable.

To the above ends, the invention consists in the matters hereinafter described and more particularly pointed out in the appended claims.

This invention will be readily understood from the following description, reference being had to the accompanying drawings, in which—

Figure 1 is a side elevation of an automobile body constituting a preferred embodiment of the invention, the relation of the wheels to the body being indicated in dotted lines; Fig. 2 is a plan view of the body shown in Fig. 1; Fig. 3 is a transverse, sectional view on line 3—3 of Fig. 2; Figs. 4, 5 and 6 are corresponding transverse, vertical sectional views taken on lines 4—4, 5—5 and 6—6, respectively, of Fig. 2.; Fig. 7 is a horizontal sectional view through one of the sides, taken on line 7—7 of Fig. 1, and looking downwardly; this section, however, being taken through the side remote from the observer, as seen in Fig. 1; Fig. 8 is a sectional detail taken on line 8—8 of Fig. 1 and showing the manner in which the meeting edges of the body sides and back are united.

In the construction of automobile bodies of the general type shown herein, owing to the relatively long wheel base and relatively great weight which must be supported, great difficulty has been experienced in so constructing the bodies as to prevent vertical flexing of the body, and consequent distortion of the joints, buckling of the side walls, and general racking of the structure. It has been the practice heretofore, invariably, so far as we are aware, to provide a relatively heavy and strong chassis frame, and upon this to mount and support a separate body. Nevertheless the difficulties have not been obviated.

In carrying out the present invention, the sides 1—1 of the vehicle body are formed of relatively heavy sheet-metal, and the body sides, instead of terminating at a point about coincident with the floor of the body, are continued downwardly to form vertical web-like extensions 2 of considerable vertical depth below the floor line of the body. In the preferred embodiment shown, these vertical web portions 2 are set back or recessed so as to stand underneath the upper portion of the body, as indicated clearly in several cross-sectional views; relatively short, horizontal flange-like portions 3—3 being formed at the points where the vertical webs join the upper side bodies. The lower edges of the webs terminate in horizontally-extending flanges 4—4; the offset portions 3 and flanges 4, together with the vertical web portions 2, forming a structure channel shaped in cross section. The web extensions 2 terminate somewhat short of the ends of the body at each end, to form clearance between body and axles as indicated at 5 and 6, Fig. 1, and the rear end wall 7 of the body terminates at its lower edge in the plane of the offsets 3.

The upper side bodies above the offsets 3 are flared upwardly and outwardly, as shown, and at their upper edges are shaped in a usual manner to inclose the seats, as indicated at 8 and 9, and to provide the intervening entrance openings 10 and 11. At their front ends, the side bodies rise to points midheight of the hood 12, and preferably, at their upper edges terminate in inturned flanges, as indicated at 13, Fig. 3, to which flanges the lower edges of the hood member 12 may be secured in any suitable or preferred manner. Just in rear of the hood the side bodies are provided with narrow upwardly extending extensions 14, which inclose and are secured against a cross partition or bulk head, as indicated in dotted lines at 15. It is to be understood that each side body, in so far as the parts thus far described are concerned, is either of single-piece or integral construction, struck out by means of dies from suitable, relatively heavy sheet-metal such as mild steel, or of several sheets similarly formed and afterwards riveted or secured into one piece.

In order to reinforce the side bodies, wheel guards, as 16 and 17, respectively, are provided, likewise formed of relatively heavy sheet metal, and having their edges secured directly against the respective side bodies. The front wheel guards 16 may be of the usual segmental shape, made outwardly flaring, and at their inner edges are provided with downturned flanges 18 (see Fig. 3), which are riveted directly against the side bodies, as best seen in Fig. 1; it being noted that the flanged lower portions of these wheel guards are offset, as indicated at 16', to follow and fit within the web-like extensions 2 of the side bodies. The lower ends of these wheel guards are provided with outturned horizontal flange portions 19 (see Fig. 7), which underlie and are riveted to foot boards 20; the inner edges of these foot boards being also arranged to rest upon the outturned flanges 4 of the side bodies. Instead of resting a wooden step on the flange 4, the said flanges 4 may themselves be extended for a step. The rear wheel guards 17 are, in a generally similar manner, provided with marginal downturned flanges 17', which are riveted directly against the side bodies, and these guards are also provided at their lower ends with horizontal flanges 17'', which underlie and are secured to the foot boards 20. It will be obvious that the wheel guards, constructed and arranged as described, perform the functions of reinforcing ribs applied to the said bodies, in addition to their additional function as wheel guards. In order to further reinforce the said bodies, boxes as 21 and 22, are mounted upon each foot board; these boxes being so constructed as to fit accurately within the recessed extensions 2, as best seen in Figs. 1, 4 and 5, so that they form, in effect, filling blocks or gussets occupying the angles formed between the upper sides of the foot boards and the outer sides of the respective web extensions. These boxes 21 and 22 of which there are preferably two at each side, are spaced apart in positions intermediate the length of the web extensions so as to best reinforce and stiffen the latter it being understood that these boxes, in addition to their reinforcing function, serve as the usual boxes for tools, battery and other accessories. Preferably, they are formed of relatively heavy sheet metal; the sides being respectively provided with flanges, as 23 and 24, riveted against the faces of the web extensions 2; the bottom members of the boxes being also provided with horizontal, inturned flanges 25 (see Fig. 7), which rest upon and are riveted to the respective foot boards. The boxes will, of course, be provided with suitable lids, as 26, suitably hinged so as to be lifted up.

The offset horizontal portions 3 of the side bodies form suitable stops or shoulders upon which the flooring 28 of the body is supported, and this floor will usually be made of relatively rigid material so as to contribute in supporting the side bodies against transverse flexure. The transverse partition or bulkhead 15, hereinbefore described, also serves the same function of stiffening the body transversely.

As a feature of some importance, both in imparting to the body a neat and rakish appearance, and also in minimizing the cost of construction, the side bodies are made straight in plan view, and arranged to converge from the wider rear end to the narrower front end, as seen clearly in plan, Fig. 2. By so constructing the body, the front part thereof is sufficiently narrow to permit the front or steering wheels to oscillate through relatively wide angles, while the rear portions of the body are roomy and afford a wide bearing support to rest upon the supporting springs.

A transverse partition member 29 not only forms the back for the front seat 8 but is continued from the upper edge of the seat downwardly to the flooring of the body, and thus constitutes a further transverse member or strut extending between the side bodies intermediate the length of the body. The side bodies are rigidly united with the rear end member 7 in any suitable manner, as for example, by overlapping flanges, as shown in detail Fig. 8.

The finished vehicle body will usually be provided with side doors to close the space between the front and rear seats; but inasmuch as we propose to make doors for this purpose of special construction the subject of a separate application, they are omitted in the present application. It will be understood however, that any suitable form of door may be mounted in any usual manner upon the body herein described.

As a further subsidiary feature of the invention, the cushions of the two seats 8 and 9 are so constructed and arranged as to form storage spaces or receptacles for small articles, such as umbrellas, gloves etc. To this end the seat cushions 30 are made of a width to terminate at their rear edges at a distance away from the back board of the seat approximately to the thickness of the back cushions 31, and the latter are in like manner arranged to terminate at their lower edges at points approximately coincident with the upper surfaces of the seat cushions. The cushions are suitably secured in these relative positions, and, when thus arranged, form spaces or receptacles, as 32 and 33, in the angles between the seat boards and back boards of the body frame. Access to these spaces is had through the slot like openings 34 between the proximate corners of the upper and lower cushions, as seen clearly in Fig. 1. It will, of course, be understood, that this feature of the invention may be embodied in other vehicle bodies, and is not necessarily combined with a construction like that herein described.

From the foregoing description it will be seen that the several objects of the invention hereinbefore stated are fully attained, and a vehicle body produced which combines at once maximum strength with minimum weight, and is also of extremely neat and finished appearance. Moreover, by forming the side bodies integral throughout, the presence of joints is avoided, and the working stresses brought upon the side bodies cannot tend to lessen the rigidity and strength of the structure. The transverse strengthening afforded by the wheel guards, the accessory boxes, the peculiar construction of the side bodies and the transverse partitions, absolutely preclude lateral or transverse bending of the side bodies to an extent sufficient to permit the latter to buckle, and accordingly the strength of the side bodies to resist vertical stresses is approximately equal to that of a web of the thickness of the material used, and of a depth equal to the distance between the lower edges of the openings 10 and 11 and the bottom edges of the side bodies. The flanges 4 at the lower edges of the side bodies; the offset horizontal portions 3 intermediate the height of the side bodies, and the wheel guards and boxes, obviously stiffen the body as a whole against directly transverse stresses. The manner in which the boxes are secured to the web extensions and to the foot boards obviously serves to support the foot boards fully as effectually as the hanger or brackets usually employed, thus enabling the latter to be dispensed with, and the foot boards are additionally supported by the underlying flanges 4 of the side bodies, and the underlying flanges upon the lower side of the wheel guards. Furthermore, the manner in which the foot boards are thus united to the side bodies throughout the full length of the former, obviously cause the foot boards to become in effect outstanding strengthening flanges or ribs, which hold the lower edges of the side bodies absolutely rigid against lateral flexure and consequent buckling. These and numerous other features are secured by the construction described, while at the same time the cost of manufacture is reduced, both in the forming of the parts and in the subsequent assembling of the same.

It will be obvious that the details of construction may be somewhat modified without departing from the spirit of the invention.

We claim as our invention:

1. An automobile body having side-bodies formed of sheet metal extending continuously both above and below the floor plane of the body throughout the principal length of the body, and laterally outstanding structural members rigidly secured to said side-bodies below said floor plane and forming reinforcements to the transverse and vertical strength of the side-bodies.

2. An automobile body having side-bodies formed of sheet metal constructed to extend uninterruptedly both above and below the floor plane of the body throughout the principal length of the latter, offset rib or flange-like portions arranged to extend longitudinally of each side body at or near the floor plane and laterally extending structural members rigidly secured to said side bodies below said floor plane and forming reinforcements to the transverse and vertical strength of the side bodies.

3. An automobile body having side bodies formed of sheet metal constructed to extend uninterruptedly both above and below the floor plane of the body throughout the principal length of the latter, the portions below the said floor plane being offset to stand in upright planes inside of the planes of the upper parts of the body, one or more sheet metal wheel guards secured edgewise and directly against the exterior of each side body and a foot board secured edgewise against the lower marginal portion of each side-body.

4. An automobile side body consisting of a sheet of metal having its marginal upper portions shaped to the contour of the box portion of the vehicle, an integral channel shaped extension extending along its lower margin below the floor plane of the vehicle, a sheet metal wheel guard flanged and riveted edgewise against said side body near each end thereof, and a foot board secured to extend along the lower edge of the side body and having its adjoining edge overlapping and secured to the lower flange of the channel-portion of the side-body, the lower ends of said wheel guards being flanged and lapped upon, and secured to the corresponding ends of said foot board.

5. An automobile side body consisting of a sheet of metal having its marginal upper portions shaped to the contour of the box portion of the vehicle, an integral channel-shaped extension extending along its lower margin below the floor plane of the vehicle, a sheet metal wheel guard flanged and riveted edgewise against said side body near each end thereof, a foot board secured to extend along the lower edge of the side body and having its adjoining edge overlapping and secured to the lower flange of the channel-portion of the side body, the lower ends of said wheel guards being flanged and lapped upon and secured to the corresponding ends of said foot board and one or more boxes fitted into the channel portion, resting upon the foot board and secured rigidly to each.

6. In combination, a sheet metal automobile side body provided along its lower margin with an inset web-like portion bounded above and below by outstanding angle portions and a foot board secured to said lower angle portion, whereby the web-like portion and foot-board together perform the function of an angle under-frame member.

7. In combination, a sheet metal automobile side body provided along its lower margin with an inset web-like portion bounded above and below by outstanding angle portions, a foot board secured to said lower angle portion, and a plurality of spaced apart gusset members uniting the foot board and the web-like portion of the side body.

8. In combination, a sheet metal automobile body provided along its lower margin with an inset web-like portion bounded above and below by outstanding angle portions, a foot board secured to said lower angle portion, and a plurality of spaced-apart gusset members uniting the foot board and web-like portion of the side body, said gusset members having sheet metal boxes having their back and bottom sides riveted to the web-like portion and foot board respectively.

9. An automobile body having side bodies formed of sheet metal extending uninterruptedly both above and below the floor plane of the body, each side body being formed with an inset angle portion extending longitudinally thereof and forming an internal floor-supporting ledge, a floor mounted upon said ledges, a partition extending between and uniting said side bodies from said floor upwardly to the top of a seat located intermediate the length of the body and forming a back for said seat, a second partition or bulkhead extending between said side bodies at the rear end of the hood and a rear end wall substantially as described.

10. An automobile body having side bodies formed of sheet metal extending uninterruptedly both above and below the floor plane of the body, each side body being formed with an inset angle portion extending longitudinally thereof and forming an internal floor supporting ledge, a floor mounted upon said ledges, a partition extending between and uniting said side bodies from said floor upwardly to the top of a seat located intermediate the length of the body and forming a back for said seat, a second partition or bulkhead extending between said side bodies at the rear end of the hood and a rear end wall, the side bodies being substantially straight in plan and arranged to converge from the rear end of the body forwardly throughout the length thereof.

WILLIE O. THOMAS.
HARRY G. MOORE.

Witnesses:
EMILIE ROSE,
ALBERT H. GRAVES.